United States Patent [19]
Harmand

[11] Patent Number: 5,399,058
[45] Date of Patent: Mar. 21, 1995

[54] REVERSIBLE PILOT FOR VALVE SEAT MACHINING DEVICES

[76] Inventor: Brice Harmand, 5275 Toscana Way, Apt. 124, San Diego, Calif. 92122

[21] Appl. No.: 229,800

[22] Filed: Apr. 19, 1994

[51] Int. Cl.⁶ ............................................. B23B 41/12
[52] U.S. Cl. ...................................... 408/80; 408/83.5
[58] Field of Search .................. 408/79, 80, 83.5, 201

[56] References Cited

U.S. PATENT DOCUMENTS

| | | | |
|---|---|---|---|
| 1,825,007 | 9/1931 | McNaught | 408/83.5 |
| 3,461,775 | 8/1969 | Devanney et al. | 408/80 |
| 3,728,940 | 4/1973 | Peterson | 408/83.5 |
| 5,017,062 | 5/1991 | Leroux et al. | 408/83.5 |

OTHER PUBLICATIONS

Serdi Product Brochure, "La Différence," for Valve Seat Machining Device and Pilots.

*Primary Examiner*—Daniel W. Howell
*Attorney, Agent, or Firm*—Brown, Martin, Haller & McClain

[57] ABSTRACT

A spindle with a self-centering grip, or collet, and one or more pilots that the grip may engage. The grip has radially expandable and contractible portions for engaging a pilot between them. The pilot is inherently centered in the spindle because the gripping forces are equally distributed around the pilot. Each pilot consists of two adjacent, coaxial cylindrical guide portions of different diameters. A set of such pilots can be provided where each guide portion of each pilot has a diameter that is different from that of every other guide portion of the pilots in the set. The guide portion diameters may correspond to the diameters of the valve guides of particular engines or may increase incrementally over a predetermined range. A pilot can thus be selected from the set to fit the valve guides of a particular engine.

14 Claims, 2 Drawing Sheets

REVERSIBLE PILOT FOR VALVE SEAT MACHINING DEVICES

BACKGROUND OF THE INVENTION

The valves of an internal combustion engine cooperate with valve seats at the surface of the cylinder head to create a seal within the chamber to contain the expanded gases within the chamber. The integrity of the seal is critical to smooth, efficient operation of the engine. Further, the valve seat must be smooth and clear on its inner surface to allow unobstructed gas flow when the valve is open. Due to mechanical failures, improper operation of the engine, or wear, the valve seats can be damaged, causing the seal integrity to be compromised. While the valve seat can be replaced, the more common practice is to machine the valve seats to restore the smooth surface required for efficient operation. Devices for machining valve seats include a rotary cutting or grinding tool which is typically made of tungsten carbide that is connected to a rotating spindle centered within the valve seat. Centering of the cutting or grinding edge is important since the seat face must be concentric with the axis of the valve and the valve guide, and the seat must be perfectly round. To maintain the tool in an orientation that is centered with respect to the valve seat the device uses a rod, commonly known as a pilot, that extends downwardly from the center of the spindle into the valve guide and rotates with the spindle. The pilot is typically made of tungsten carbide for wear resistance. The same tool may also be used for machining the valve seat housing if the valve seats are to be replaced.

Valve seat machining devices known in the art are difficult to align precisely. The pilot is retained in a bore in the center of the spindle by a set screw. Because the bore must have a slightly larger diameter than the portion of the pilot that is retained within it, the portion of the pilot that extends through the valve guide may be slightly off-axis with respect to the central axis of the valve guide. Misalignment of the pilot causes misalignment of the cutting tool on the valve seat and may also stress the pilot.

In addition, valve seat machining devices known in the art are uneconomical. The engines of different manufacturers typically have valve guides of different diameters. Distributors, retailers and persons who regularly repair engines must therefore maintain an inventory of pilots covering the entire range of diameters. The pilots are expensive because they must be formed to precise tolerances and are made of costly materials such as tungsten carbide.

It would be desirable to provide a valve seat machining device that reduces the number of different pilots that must be maintained in an inventory. It would also be desirable for the device to facilitate alignment of the pilot in the spindle. These problems and deficiencies are clearly felt in the art and are solved by the present invention in the manner described below.

BRIEF SUMMARY OF THE INVENTION

The present invention comprises a spindle having a self-centering grip, i.e., a collet, and one or more pilots that may be retained by the collet. The collet has a plurality of radially expandable and contractible portions for engaging a pilot between them. Each pilot consists of two adjacent, coaxial cylindrical guide portions of different diameters. A set of such pilots can be provided where each guide portion of each pilot has a diameter that is different from that of every other guide portion of the pilots in the set. The guide portion diameters may correspond to the predetermined diameters of the valve guides of particular engines or may increase incrementally over a predetermined range. A pilot can thus be selected from the set to fit the valve guides of a particular engine.

The radially expandable and contractible portions of the collet can be adjusted to engage a pilot of any diameter in the set. The first guide portion of a pilot can be readied for use by engaging the second guide portion of the pilot in the collet, and the second guide portion of a pilot can be readied for use by engaging the first guide portion of the pilot in the collet. Regardless of the diameter of the guide portion engaged, the collet inherently centers the pilot because the radially expandable and contractible portions move in synchronism with one another to simultaneously apply equal forces to multiple sides of the guide portion.

BRIEF DESCRIPTION OF THE DRAWINGS

Understanding of the present invention will be facilitated by consideration of the following detailed description of a preferred embodiment of the present invention, taken in conjunction with the accompanying drawings, in which like reference numerals refer to like parts and in which.

DETAILED DESCRIPTION OF A PREFERRED EMBODIMENT

Figure 1:
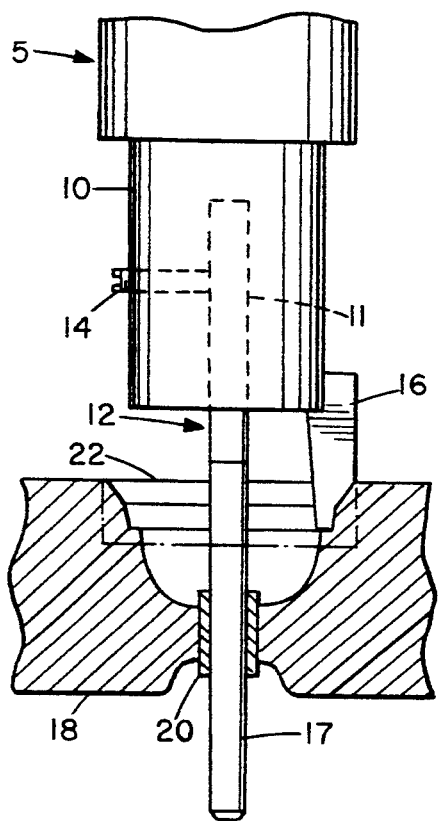
FIG. 1 is a side elevational view of a prior art pilot, spindle and grip for a valve seat machining device, showing a sectional view of the cylinder head and valve seat.

As illustrated in FIG. 1, a valve seat machining device 5 includes a prior art spindle 10 and a prior art pilot 12 that rotate together in response to the well-known operation of the drive portion 6 of the device. The proximal end 11 of pilot 12 is received in a bore centrally located in the bottom of spindle 10 and is secured to spindle 10 by a set screw 14. Spindle 10 has a cutting tool 16 eccentrically mounted with respect to the axis of rotation of spindle 10 and pilot 12. The distal end 17 of pilot 12 extends into the engine cylinder head 18 and through the valve guide 20. Distal end 17 of pilot 12 has a diameter approximately 0.01 millimeters (mm) smaller than the inside diameter of valve guide 20 to allow it to rotate therein. Pilot 12 thus remains in a centered orientation with respect to valve seat 22. Cutting tool 16 has a profile that corresponds to the desired contours of valve seat 22. As spindle 10 and pilot 12 rotate, cutting tool 16 rotates and machines valve seat 22 to those contours, as known in the art.

A group or set of pilots, each having a distal end 17 with a diameter differing from that of another pilot 12 in the set by 0.01 mm is commercially available. However, proximal end 11 of each pilot 12 in such a set has the same diameter because the diameter of the bore in spindle 10 is fixed.

Figure 2:
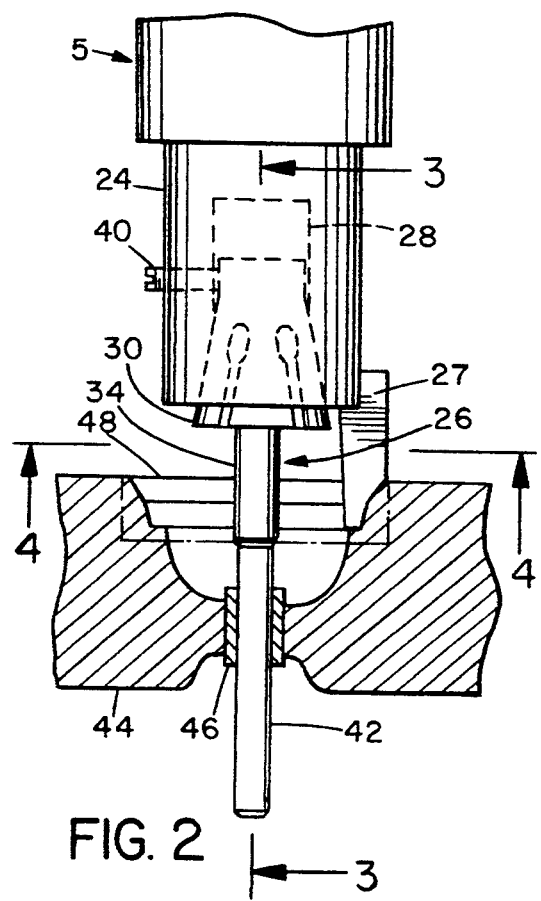
FIG. 2 is a side elevational view of the reversible pilot, spindle and radially adjustable collet of the present invention, showing a sectional view of the cylinder head and valve seat.
Figure 3:
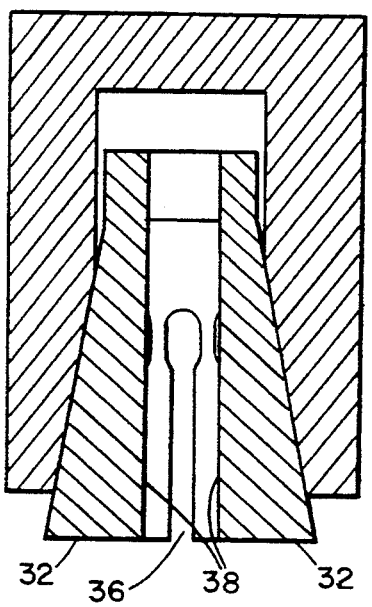
FIG. 3 is a sectional view taken on line 3—3 of FIG. 2 with the reversible pilot removed from the collet.
Figure 4:
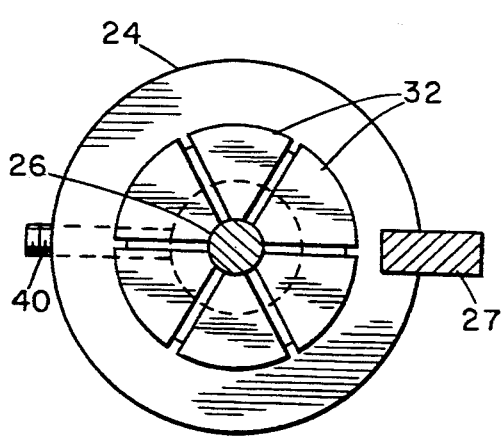
FIG. 4 is a partial sectional view taken on line 4—4 of FIG. 2.

As illustrated in FIG. 2, in accordance with the present invention valve seat machining device 5 includes a spindle 24 and a reversible pilot 26 that rotate together in response to the well-known operation of the drive portion 6 of device 5. Spindle 24 has a cutting tool 27 eccentrically mounted with respect to the axis of rotation of spindle 24 and pilot 26. A cavity 28 in spindle 24 receives a collet 30. Collet 30 has a frusto-conical portion comprising a plurality of resilient fingers 32. Here, six fingers 32 are shown. When collet 30 is in cavity 28 the frusto-conical portion contacts a correspondingly-shaped wall of cavity 28. If collet 30 is forced upwardly into cavity 28 the wall of cavity 28 forces fingers 32 to contract radially inwardly.

A first end 34 of pilot 26 is received in a bore 36 defined by the inside surfaces 38 of fingers 32. When collet 30 is forced upwardly, inside surfaces 38 move radially inwardly to grip first end 34. First end 34 is inherently centered in collet 30 and spindle 24 because it experiences equally distributed gripping forces.

Fingers 32 should be sufficiently resilient and bore 36 should be sized to firmly grip a pilot 26 having any diameter within a predetermined range. Although the predetermined range may include any diameters, the smallest and largest diameters in the range preferably differ by approximately one millimeter.

To use the present invention, first end 34 of pilot 26 is inserted into bore 36, and collet 30 is inserted into cavity 28. A set screw 40 extends in a radial direction through spindle 24 into cavity 28 where the inside surface of its end is pitted against collet 30 to secure it in spindle 24. Collet 30 should be urged upwardly with sufficient force to firmly grip pilot 26 before tightening set screw 40. The second end 42 of pilot 26 is inserted into the engine cylinder head 44 and through the valve guide 46. Cutting tool 27 is aligned with the valve seat 48 to be machined because pilot 26 is centered with respect to spindle 24. Valve seat machining device 5 may then be used in the manner known in the art to machine valve seat 48. Cutting tool 27 has a profile that corresponds to the desired contours of valve seat 48. As spindle 24 and pilot 26 rotate, cutting tool 27 rotates and machines valve seat 48 to those contours.

Figure 6:
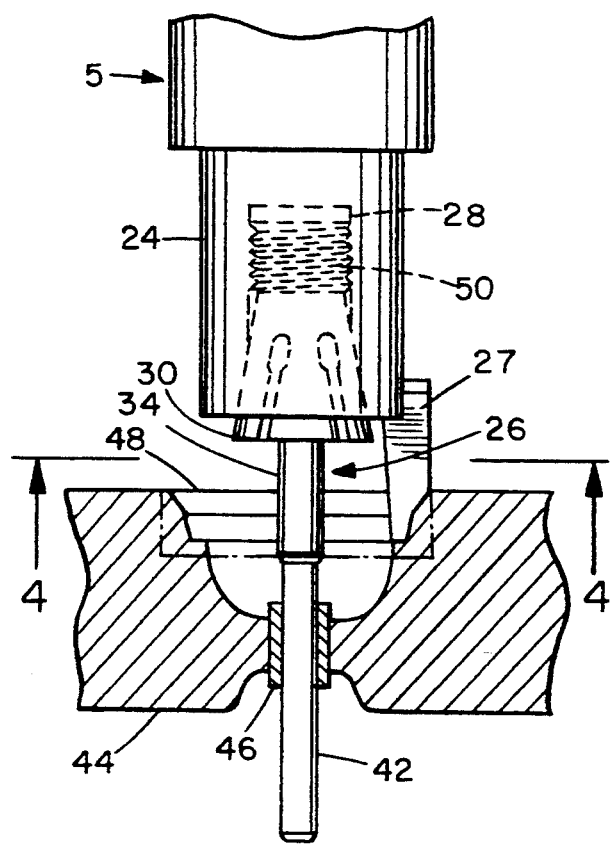
FIG. 6 is a side elevational view of the invention with an alternate means for retaining the collet within the spindle.

An alternative means for retaining the collet 30 in the spindle is provided by external threads 50 disposed on the upper portion of the collet 30, as illustrated in FIG. 6. Corresponding internal threads are formed in the walls of cavity 28. The thread pattern should be the reverse of the direction that the spindle rotates so that the collet does not come unscrewed from the spindle during use. Other means may be provided for retaining the collet firmly within the spindle, including threaded caps which screw onto the outer surface of the spindle.

Figure 5:
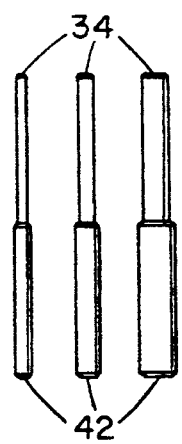
FIG. 5 is a side elevational view of a set of reversible pilots.

As illustrated in FIG. 5, a set comprising a plurality of pilots 26 may be provided. First and second ends 34 and 42 of each pilot 26 have different diameters, and the diameters of first and second ends 34 and 42 are different from those of all other pilots 26 in the set. It should be noted that the difference in diameter of the pilots illustrated is greatly exaggerated to emphasize that difference. The diameters of first and second ends 34 and 42 of each pilot 26 preferably differ by 0.01 mm. Collet 30 can grip either first end 34 or second end 42 because collet 30 is adaptable to any diameter within the predetermined range, as described above. If collet 30 grips first end 34, second end 42 may be extended through valve guide 46 to center spindle 24 with respect to valve seat 48. If collet 30 grips second end 42, first end 34 may be extended through valve guide 46 to center spindle 24 with respect to valve seat 48. The gripping force of collet 30 will not damage pilot 26 because pilot 26 is made of a hard material such as tungsten carbide.

The number of pilots 26 in a set having diameters increasing from a predetermined minimum to a predetermined maximum in a uniform, predetermined increment is one-half the number of prior art pilots that would be required to form a set covering the same range. The present invention thus reduces by one-half the number of pilots that an engine repairer or parts distributor has on hand or that a manufacturer of valve seat machining devices produces. For example, if a prior art set consists of 100 pilots 12 having distal ends 17 with diameters increasing by increments of 0.01 mm, a set covering the same range of diameters in accordance with the present invention would consist of only 50 pilots 26.

It will be evident that there are additional embodiments and applications which are not disclosed in the detailed description but which clearly fall within the scope and spirit of the present invention. The specification is, therefore, not intended to be limiting, and the scope of the invention is to be limited only by the following claims.

I claim:

1. An apparatus for centering a valve seat machining device with respect to a valve guide, comprising:
   a cylindrical pilot;
   a spindle for connecting to a drive portion of said valve seat machining device, said spindle having a spindle cavity defined by a cavity wall; and
   a collet having a plurality of resilient fingers for moving in a radial direction in response to relative axial motion between said collet and said cavity wall, and said fingers have inside surfaces defining a bore for retaining said pilot, the diameter of said bore selectably changeable in response to said relative axial motion.

2. The apparatus claimed in claim 1, further comprising a cutting tool eccentrically mounted to said spindle with respect to an axis of rotation of said spindle.

3. The apparatus claimed in claim 1, wherein said bore has a diameter changeable by no more than approximately one millimeter.

4. The apparatus claimed in claim 1, further comprising a set screw radially disposed in said spindle and extendable into said spindle cavity for retaining said collet in said spindle.

5. The apparatus claimed in claim 1, further comprising an external thread disposed on a portion of said collet for mating with an internal thread disposed within said spindle cavity for retaining said collet in said spindle.

6. The apparatus claimed in claim 1, wherein said pilot is made of tungsten carbide.

7. The apparatus claimed in claim 1, wherein said pilot is divided lengthwise into two portions, a first portion having a first diameter and a second portion having a second diameter larger than said first diameter.

8. An apparatus for centering a valve seat machining device with respect to a valve guide, comprising:

a pilot consisting of first and second cylindrical guide portions adjacent one another, coaxially aligned with one another, and of different diameters from one another;

a spindle having a spindle cavity defined by a wall, said spindle being connectable to a drive portion of said valve seat machining device; and a grip connected to said spindle comprising at least one radially expandable and contractible portion having an inside surface, said inside surface defining a bore having a selectably changeable diameter for receiving one of said guide portions.

9. The apparatus claimed in claim 8, further comprising a cutting tool eccentrically mounted with respect to an axis of rotation of said spindle.

10. The apparatus claimed in claim 8, wherein said bore has a diameter changeable by no more than approximately one millimeter.

11. The apparatus claimed in claim 8, wherein said pilot is made of tungsten carbide.

12. The apparatus claimed in claim 8, wherein said grip comprises a collet having a plurality of resilient fingers for moving in a radial direction in response to relative axial motion between said collet and said wall, and said fingers have inside surfaces defining a bore, the diameter of said bore changeable in response to said relative axial motion.

13. The apparatus claimed in claim 8 wherein said grip comprises a set screw in said spindle extendable into said spindle cavity for retaining said pilot with its inside surface.

14. The apparatus claimed in claim 8 further comprising a set screw in said spindle extendable into said spindle cavity for retaining said grip with its inside surface.

* * * * *